INVENTOR.
BRUCE W. PRESTON

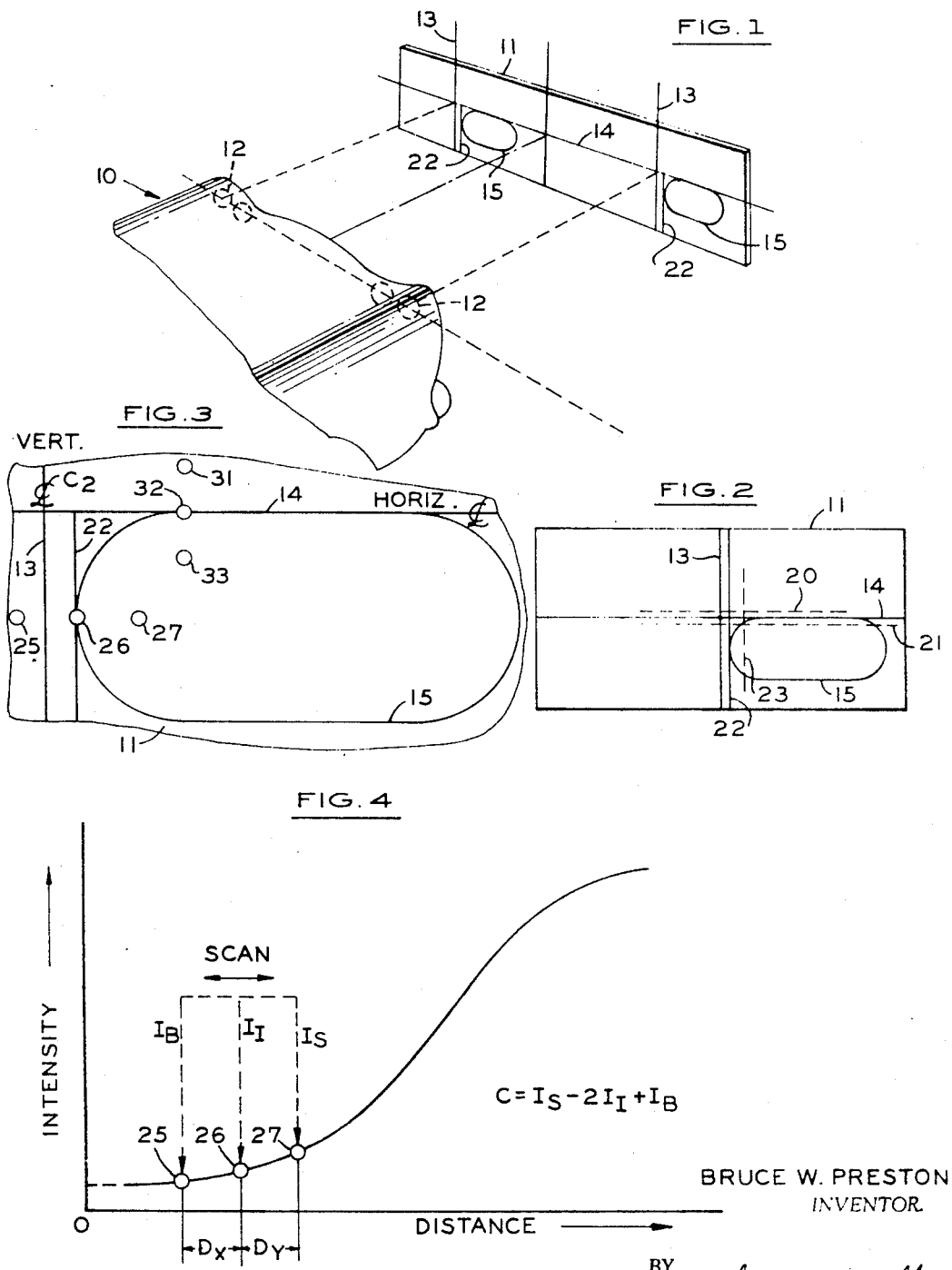

BY John R. Faulkner
Keith L. Zerschling
ATTORNEYS

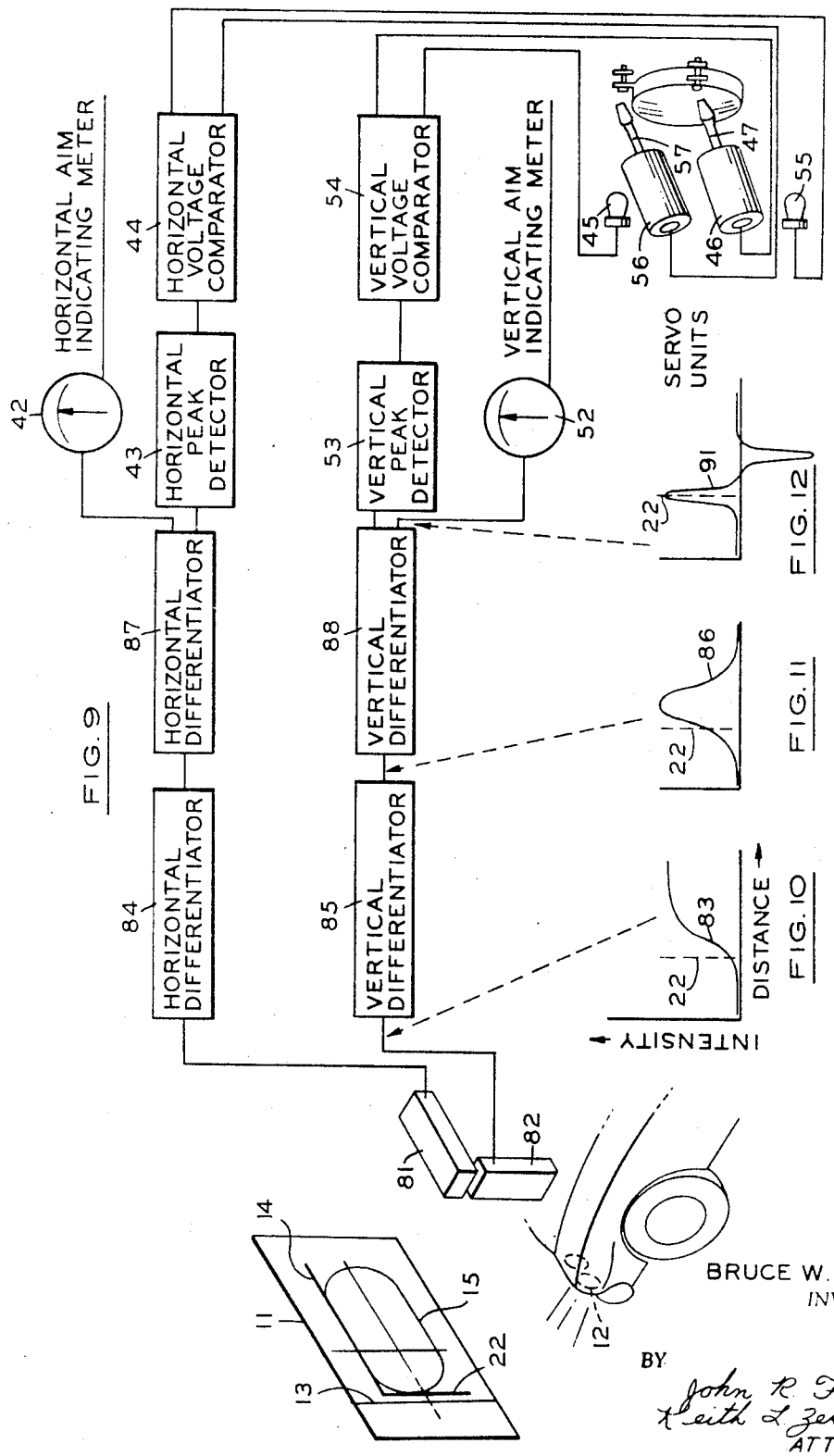

Sept. 16, 1969     B. W. PRESTON     3,467,473
HEADLAMP AIMING
Filed Dec. 28, 1964     4 Sheets-Sheet 4
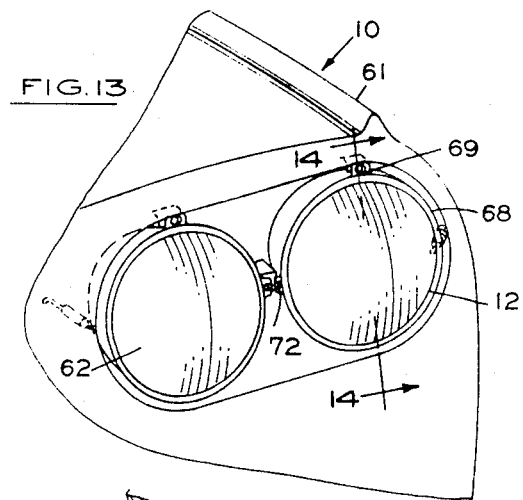
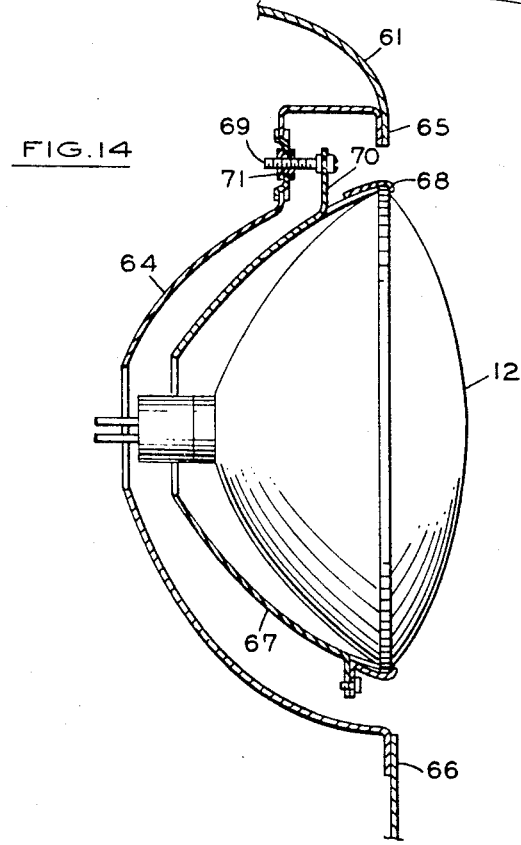
BRUCE W. PRESTON
INVENTOR.
BY John R. Faulkner
Keith L. Zerschling
ATTORNEYS 3,467,473
HEADLAMP AIMING
Bruce W. Preston, Dearborn, Mich., assignor to The Ford Motor Company, Dearborn, Mich., a corporation of Delaware
Filed Dec. 28, 1964, Ser. No. 421,422
Int. Cl. G01j 1/00, 1/44
U.S. Cl. 356—121         13 Claims

ABSTRACT OF THE DISCLOSURE

A photoelectric headlamp aiming apparatus and method in which the high intensity zone of the low-beam headlamps of an automotive vehicle may be properly positioned by scanning the high intensity zone over an aiming board. The aiming board includes photoelectric means positioned relative to a properly positioned edge of the high intensity zone and means are coupled to said photoelectric means located on the aiming board for computing the second derivative or the approximate second derivative as the edge of the high intensity zone is scanned over the photoelectric means located on the board. When the second derivative or approximate second derivative becomes a maximum, the high intensity zone of the low-beam headlamps is properly positioned and aimed.

---

This invention relates to the proper aiming of the low-beam or city driving lamps of an automotive vehicle, and more particularly to a method and apparatus for quickly and accurately aiming these lamps as the vehicle comes off the production line.

The basic regulatory code used by most state, federal, and local regulating agencies is that described as the Lighting Inspection Code—SAE J599a: SAE Recommended Practice, which appears on pages 735–737 of the Society of Automotive Engineers 1964 SAE Handbook. With respect to the aiming of the low-beam or city driving lamps of the automotive vehicle, it states that beams should be inspected for aim either (1) on a screen at a distance 25′ ahead of the headlamps, or (2) with inspection equipment which gives essentially equivalent results, or (3) with a mechanical headlamp aimer which can be used with mechanically aimable headlamps.

If a screen is to be used, it must be of adequate size and spaced at a distance of 25′ from the lamp to be aimed. The light pattern projected from the lamp is viewed on this aiming screen which has target lines marked on its surface for use in visual evaluations of the aiming. The code described above states that for vertical aim of the low beam, the top edge of the high intensity zone shall be located along a horizontal centerline located at the level of the lamp center within limits of plus or minus 2″. For lateral or horizontal aiming, the left edge of the high intensity zone shall be located 2″ to the right of the vertical centerline located straight ahead of the lamp center within limits of 4″ to the right and 2″ to the left of the desired position. Each projected light pattern must be examined visually by the operator and the position of the high intensity zone relative to the aiming target lines on the screen must be evaluated and adjusted to provide proper aiming in the judgment of the operator.

An alternate means for inspecting for low-beam aim may be with a mechanical headlamp aimer which can be used with mechanically aimable headlamps. This mechanical headlamp aimer must comply with the code mentioned above, and it ordinarily includes devices that rest against three aiming pads on the headlamp face lens. The system depends generally upon bubble level indicators or other mechanical means to indicate proper headlamp adjustment. This method of aiming the low beams is highly dependent upon a very precise relationship between the position of the aiming pads and the projected light pattern. It is seldom used because of the inherent variations and difficulties in maintaining this very precise relationship.

Automotive and truck headlamps are usually aimed in assembly plants by visually examining the light pattern projected on a target board aiming screen at the required distance of 25′, and adjusting these lamps by manual means to conform to the Society of Automotive Engineers Recommended Practice as brought out above. A few assembly plants, however, do use the mechanical aiming devices described above. As is evidenced by the large use of the visual based system, it appears that this system is superior to the mechanical aiming by mechanical aiming devices. The visual system, however, is not without its problems. The primary difficulties are due to the variations in the operator's interpretation of the position of the top and left edges of the high intensity zone relative to the horizontal and vertical aiming target lines on the screen. Added to this are the inherent problems of operator fatigue, attitude, visual acuity and other human frailties. Even under the best conditions, variations in the quality of the aiming of the headlamps by the visual system do exist.

It is apparent, therefore, that there is a need for a new system for aiming headlamps that will eliminate or minimize the variations described above and that will eliminate or substantially reduce the disadvantages that are inherent in both the visually based system and the mechanical system described above. It is essential that such a system be capable of accurately and consistly interpreting the positions of the high intensity zone of the projected light pattern from the low-beam headlamp. It must indicate the direction of adjustment necessary for proper alignment and must indicate when proper adjustment has been achieved.

In the present invention, means are provided for properly aiming the light pattern of a low-beam headlamp by properly determining and locating the edge of the high intensity zone of the low-beam light pattern on a headlamp aiming screen or target board. The basic difficulty in determining this edge instrumentally has been caused by the general tendency of this area (i.e. the edge) to be gradient in character rather than the less complex situation consisting of immediately adjacent illuminated and non-illuminated areas. Further, the general character of this gradation in light intensities varies considerably between individual lamps and lamps of different manufacture. Regardless of these variations, if the conditions are suitable it is possible for an experienced person to visually judge the location of this edge in a reasonably consistent manner.

It should be noted also that certain variations exist among the judgments of observers in discerning the edge of the high intensity zone. Such judgments are based on the contrast in intensities observed in immediately adjacent areas of the projected light pattern. Such judgments of contrast can be approximately represented by mathematical ratios of these intensities. It should be particularly noted, however, that such visual judgments also take into consideration the background or ambient light and automatically compensate for this within limits. In the invention, the inventor has simulated those psychological processes which take place when a headlamp aim operator visually determines the edge of the light pattern as projected by the low-beam lamps of an automotive vehicle.

The present invention is considered fully capable of determining the edge of the light pattern and of simulating the psychological processes which take place when a headlamp aim operator visually determines this edge.

As a result, the present invention is considered fully capable of accurately and rapidly aiming the low-beam headlamps of an automotive vehicle while substantially eliminating or reducing the disadvantages and inherent inaccuracies of the various other systems described above.

The inventor has found, based upon observation and subsequent verification by quantitative measurement, that the visual system in a human being discerns the edge of a high intensity zone at the place where the rate of change of slope of the intensity versus distance curve is a maximum. This rate of change of slope of the intensity curve with respect to distance may be defined as the second derivative of the intensity with respect to distance when measured in a direction substantially perpendicular to the edge of the high intensity zone of a light pattern.

Th lighting codes mentioned above require that the edges, horizontal and vertical, of the high intensity zone of a low-beam light pattern from an automotive headlight be located in a certain position with respect to horizontal and vertical lines on a headlamp aiming board. The present invention provides a system and means for locating these edges and for adjusting the low-beam headlamp pattern such that the edges are in a proper position by using the second derivatives of intensity with respect to distance in directions substantially perpendicular to these edges.

In one embodiment of the invention, the second derivative may be derived by use of a scanning means which will scan and sense the light intensity in the region of a properly positioned edge of a high intensity zone along a line substantially perpendicular to the edge. The output from the sensing means may be applied to a first differentiator and a second differentiator to compute the second derivative of the light intensity with respect to distance, and the output from the second differentiator may be fed to an aim indicating meter. With the sensing means properly indexed with respect to a line on the aiming board which indicates the position of the edge of a properly aimed high intensity zone of a low-beam light pattern, the headlights are adjusted until the indicating meter indicates a maximum value thereby indicating that the second derivative of light intensity with respect to distance scanned is a maximum at this line. It should be apparent that this system is applied to both the horizontal and the vertical edges (the upper and the left-hand edge respectively) of the low-beam headlamp pattern.

In the alternative, means may be employed to automatically adjust the high intensity zone of a low-beam headlamp into proper position. In order to do this, peak detectors are coupled to the second differentiators in both the horizontal and vertical arrangements for adjusting the horizontal and vertical edges of the high intensity zone. Voltage comparators are connected to each peak detector and servo units are connected to each voltage comparator that include adjusting tools that may be applied to the headlamp adjusting means.

The servo units include means for automatically driving the adjusting screws of the headlamp so that the light pattern is scanned from one extreme position, for example, to the left of the properly aimed position of the vertical edge of the light pattern to another extreme position, for example, to the right of the properly aimed position. As this happens, the sensing means will sense the variation in light intensity with respect to distance, and the peak detectors will sense when the second derivative of the intensity with respect to the distance scanned is a maximum. This value will be stored in the voltage comparator. The servo unit will then stop and reverse so that the low-beam light pattern is again brought back toward its original position. When it returns to the point where the second derivative is again a maximum as stored in the voltage comparator, the servo unit will stop and the high intensity zone of the low-beam headlamps will be in a proper horizontal or lateral position.

The above system could also be used with a manual screw driver rather than a servo unit and with a lamp that will automatically light when the low-beam headlamp has been adjusted so that the second derivative is again a maximum after a first total scan from the extreme left to the extreme right position.

This same apparatus and procedure, as mentioned above, may be applied to the adjustment of the vertical positioning of the high intensity zone of the low-beam head-lamp with the difference, of course, that the scanning and movement of the light pattern takes place in a vertical direction substantially perpendicular to the upper horizontal edge of the high intensity zone of this light pattern.

It has been found that the second derivative of light intensity with respect to distance may be computed on an approximate basis to give results that are acceptable and are very close to the results that could be obtained with the system described above in which the exact differentiation of the light intensity with respect to distance is accomplished. In order to do this, the following expression for approximating the second derivative of light intensity with respect to distance is employed:

$$C = I_s - 2I_I + I_B$$

Where C is the approximate second derivative, $I_s$ is the superior or greatest light intensity; $I_I$ is an inferior or intermediate light intensity, and $I_B$ is the base, background or ambient light intensity. The values $I_s$, $I_I$ and $I_B$ are derived from three adjacent light sensitive devices or photoreceptors positioned on the aiming board.

The three light sensitive devices or photoreceptors are positioned on the aiming board in a direction substantially perpendicular to the direction of the edge of the high intensity zone to be aimed. In a practical system, therefore, for aiming the upper edge and the left edge of the high intensity zone of a low-beam light pattern, three light sensitive devices or photoreceptors are positioned in a vertical line with the middle one positioned on the aiming board in the required position for the upper edge of the high intensity zone, while another set of three transducers or light sensitive devices is positioned along a horizontal line substantially perpendicular to the left-hand edge of the high intensity zone with the center light sensitive device or photoreceptor being positioned on the line on the aiming board which denotes or indicates the proper position of the lefthand edge of the low-beam light pattern.

The photoreceptor or light sensitive device located inboard of the edge of a properly aimed high intensity zone of a low-beam headlamp pattern senses or produces a signal proportional to the light incident on it which is the value $I_s$. The intermediate or center light sensitive device produces a signal representative of $I_I$, the inferior or intermediate light intensity zone, and the third light sensitive device located outboard of the edge of the high intensity zone produces a signal representative of $I_B$, the base, background or ambient light intensity. It should be noted that the light intensity $I_I$ is sensed at the edge of a properly aimed low-beam headlamp pattern, and as brought out above, the light sensitive device or phototransducer producing $I_I$ is located on a line which indicates or denotes the position of the edge of the properly aimed high intensity zone.

The output from each of the three photoreceptors or light sensitive devices in each set is fed through a computer amplifier that computes the approximate second derivative, C, for each set and feeds these values to horidontal and vertical aim indicating meters. As discussed with the previous embodiment, the low-beam headlamp pattern may then be adjusted to bring the horizontal aim indicating meter and the vertical aim indicating meter to a maximum reading which indicates a maximum value of the approximate second derivative. Also, as in this case, the servo unit arrangement using peak detectors and voltage comparators may be used as well as the lighting arrangement in which a light may be lighted when the approximate second derivative is maximized for a second time after an initial scanning adujstment of the low-beam headlamp pattern over the set of light sensitive devices or photoreceptors.

The system and method described above using the approximate second derivative has been adequately tested by comparing the aiming of the headlamps by this system with the aiming of the headlamps by the visual method using the best of operators. This has been accomplished by comparing the aiming of the system and method of the invention with accurately obtained exeprimental data relative to the exact correct position of the edges of the high intensity zone of a properly aimed low-beam headlamp pattern. The results have been that the aiming done by the system and method of the present invention using the approximate second derivative in every respect gives essentially equivalent results to the visually aimed headlamp beams as called for by the regulatory codes. It has been determined also that the results obtained by the present invention are as good as or superior to the results obtained by the best of operators using the visual system when these two systems are tested against the correct aiming of the low-beam headlamps by accurate measurement methods.

An object of the present invention is the provision of an apparatus and method for aiming the low-beam headlamp pattern of an automotive vehicle that is fast in operation and that eliminates the disadvantages inherent in the visual method of aiming of headlamps.

Another object of the invention is the provision of a method and system for aiming of low-beam headlamps of an automotive vehicle which is very rapid and accurate and will substantially eliminate aiming inaccuracies that may occur in the use of the visual method.

A further object of the invention is the provision of a system and method for accurately aiming the low-beam headlamps of an automotive vehicle that simulates the physiological process used in visual aiming of headlamps, and that gives essentially equivalent or more accurate results in the aiming of the low-beam headlamp pattern of an automotive vehicle.

Other objects and attendant advantages of the present invention will be more readily apparent as the specification is considered in connection with the attached drawings in which:

FIGURE 1 is a schematic view of an automotive vehicle shown in proper position in relation to a vehicle headlamp aiming board;

FIGURE 2 discloses the high intensity zone of one low-beam headlamp properly positioned on a vehicle headlamp aiming board with respect to projected horizontal and vertical lines through the centerline of the low-beam headlamp;

FIGURE 3 shows the position of the horizontal and vertical set of light sensitive devices or photoreceptors of the present invention when mounted on the headlamp aiming board shown in FIGURES 1 and 2 and in relation to the high intensity zone of a low-beam headlamp;

FIGURE 4 shows a distribution of the light intensity with respect to distance scanned in either a horizontal or vertical direction along the position of the vertical or horizontal sets of light sensitive devices or phototransducers shown in FIGURE 3;

FIGURE 9 is a block diagram or schematic of another embodiment of the invention in which the exact second derivative of light intensity with respect to distance may be employed to properly aim the low-beam headlamps of an automotive vehicle;

FIGURE 10 is a plot of a light intensity curve from a headlamp versus distance and is similar to FIGURE 6;

FIGURE 11 is a plot of the first derivative of the light intensity curve of FIGURE 10 and is similar to FIGURE 7;

FIGURE 12 is a plot of the second derivative of the light intensity curve of FIGURE 10 and is similar to FIGURE 8;

FIGURE 13 is a front elevational view of one side of an automotive vehicle using a four headlamp system, and FIGURE 14 is a sectional view through the low-beam headlamp taken along the line 14—14 of FIGURE 13 showing the adjusting mechanism for this headlamp.

Figure 5:
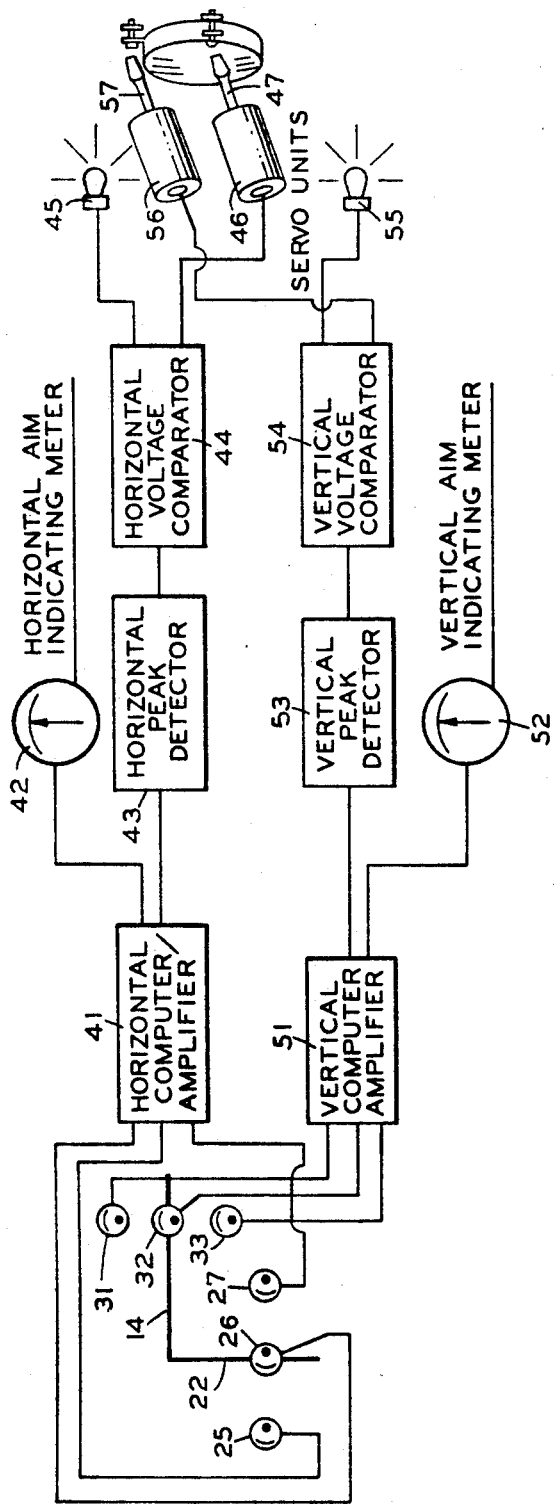
FIGURE 5 is a block diagram or schematic of the apparatus of the present invention using or' employing the approximate second derivative of light intensity with respect to distance for properly aiming the low-beam headlamp of an automotive vehicle.

The invention will be described and is illustrated in relation to a four-lamp headlight system in which 5¾" type 2 sealed beam headlamps are used for providing the low-beam light pattern or illumination when the vehicle operator has his dimmer switch positioned for low-beam operation. It is to be understood, however, that this system is equally applicable to headlamp systems for automotive vehicles which employ two headlamps only. In the latter system, a 7" sealed beam headlamp is used that employs a pair of filaments, one of which is energized when the lamp is switched to its low-beam position. It should be understood also that although the system is illustrated with horizontally arranged double headlamps on either side of the vehicle, that it may be equally employed with vertically arranged headlamps positioned on either side of the vehicle. Also, the spacing of the light sensitive devices or photoreceptors may be adjusted to suit various vehicles. The spacing described in this specification is that which was found to be satisfactory for a given vehicle.

Referring now to the drawings in which like reference numerals designate like parts throughout the several views thereof, there is shown in FIGURE 1 an automotive vehicle 10 positioned properly before a headlamp aiming screen or target board 11. As previously pointed out, the distance between the headlamps to be aimed and the headlamp aiming screen or target board is 25'. The low-beam headlamps of the headlamp system to be properly aimed as shown here, are the outboard lamps 12 on either side of the vehicle. As shown on the headlamp aiming screen or target board 11 a vertical line 13 is positioned on the headlamp aiming screen or target board 11 on each side thereof which is a projection of a vertical line through the centerline of each of the lamps 12. A horizontal line 14 is also positioned on the headlamp aiming screen or target board 11, and this line is a projection of the horizontal centerline through the center of the lamp 12.

Turning now to FIGURE 2 which discloses one-half of the headlamp aiming screen or target board 11, the standards for aiming a low-beam headlamp 12 will be discussed. It is to be understood that the discussion relative to FIGURE 2 applies equally to the low-beam headlamp 12 located on the right-hand side of the vehicle and the low-beam headlamp 12 located on the left-hand side of the vehicle. The high intensity zone of the low-beam headlamp 12 is indicated by the generally oblong pattern 15. The SAE standards mentioned above state that the upper edge of the high intensity zone shold be located on the horizontal line 14 which represents the level of the center of the lamp 12. The aiming of the low-beam headlamp in a vertical direction is unsatisfactory if the edge of this high intensity zone is more than 2" above the horizontal centerline 14 or more than 2" below it as indicated by the dashed lines 20 and 21.

In the lateral aiming of the low-beam headlamp 12, the left edge of the high intensity zone 15 should be located on a vertical line 22 located 2" to the right of the vertical line 13 which is a projection of a vertical line through the center of the lamp 12. Aiming is unsatisfactory if this edge is more than 4" to the right of the vertical line 22 as represented by the dashed line 23 or more than 2" to the left of the vertical line 22 which would be at the position of the projected vertical centerline of the lamp 12 as represented by the vertical line 13.

Referring now to FIGURE 3, there is shown a first group of three light sensitive devices or photoreceptors 25, 26 and 27, positioned on a horizontal line parallel to the projected horizontal centerline of the lamps 12 as represented by the line 14. These photoreceptors or light sensitive transducers are positioned, as shown in the drawing for a particular type vehicle, for example, a 1964 Ford Galaxie. The position may be adjusted to suit the lighting arrangements on other vehicles.

For the 1964 Ford Galaxie, the first photoreceptor or light sensitive device 25 is positioned 4" to the left of the vertical line 22 that marks the correct position of the left edge of the high intensity zone of a properly aimed low-beam headlamp. It can be appreciated also that this photoreceptor or light sensitive device is positioned 2" to the left of the projected vertical centerline 13 of the lamp 12. It is also located 7" below the projected horizontal centerline 14 of the lamp 12. The photoreceptor or light sensitive transducer 26 is positioned 4" to the right of photoreceptor or light sensitive device 25 and is, therefore, positioned on the line 22 that marks the left edge of a high intensity zone of a properly aimed headlamp. The third light sensitive device or photoreceptor 27 is positioned 4" to the right of the light sensitive device or phototransducer 26.

Three additional photoreceptors or light sensitive devices 31, 32 and 33 are positioned on a vertical line located 7" to the right of the vertical line 22 and hence 9" to the right of the vertical line 13 through the centerline of the low-beam headlamp 12. The first photoreceptor or light sensitive device 31 is positioned 3" above the horizontal centerline 14, while the second light sensitive device or photoreceptor 32 is positioned on the horizontal line 14, and the third light sensitive device or photoreceptor 33 is positioned 3" below the second light sensitive device or photoreceptor 32.

Referring now to FIGURE 4 which is a curve of the light intensity versus horizontal distance starting to the left of the high intensity zone 15, for example, to the left of vertical centerline 13 into the highest intensity portion of the high intensity zone 15, the location of the horizontal light sensitive devices or photoreceptors 25, 26 and 27 can be seen relative to the light distribution curve of a properly aimed low-beam headlamp. The light intensity received by the light sensitive device or photoreceptor 25 is denoted by $I_B$, the light intensity received by the light sensitive device or photoreceptor 26 is denoted $I_I$, and the light received by the light sensitive device or phototransducer 27 is denoted $I_s$. It can be readily appreciated that the three photoreceptors or light sensitive devices 25, 26 and 27 are fixed on the lamp aiming board or target screen 11 as described in relation to FIGURE 3 and that the light intensity distribution curve shown is shifted horizontally as horizontal adjustment of the low-beam light pattern from headlamp 12 is accomplished. This curve applies equally to light distribution with respect to distance in a vertical direction, with the curve starting above the top edge of the high intensity zone and extending downwardly into it and the three light sensitive devices or photoreceptors 25 through 27 replaced by the three light sensitive devices or photoreceptors 31 through 33.

It has been found that for certain vehicles, for example, the 1964 Ford Galaxie, the distances $D_x$ and $D_y$ should be 4" for horizontal or lateral aim and 3" for vertical aiming or adjustment of the high intensity zone of the low-beam light pattern. As was previously stated, it has been found that when the approximate second derivatives of light intensity with respect to a distance measured substantially perpendicular to the edges of the high intensity zone are a maximum at the lines 22 and 14, that the edges of the high intensity zone are properly positioned, and hence the low-beam light pattern is properly aimed. Thus when the quantity $C=I_s-2I_I+I_B$ is a maximum at the lines 22 and 14, where as previously stated, C is the approximate second derivative of light intensity with respect to distance, the low-beam headlamp pattern is aimed properly.

Figure 8:
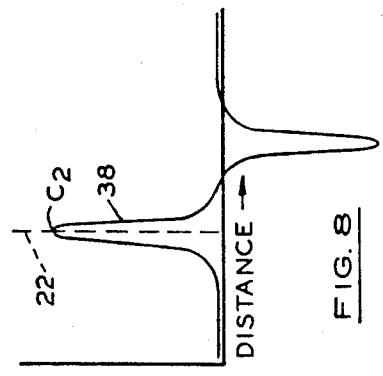
FIGURE 8 is a plot of the second derivative of the light intensity curve of FIGURE 6.
Figure 7:
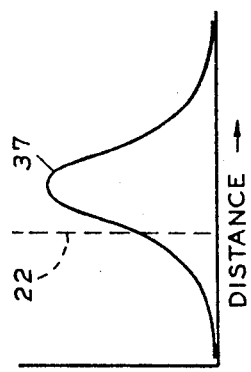
FIGURE 7 is a plot of the first derivative of the light intensity curve of FIGURE 6.
Figure 6:
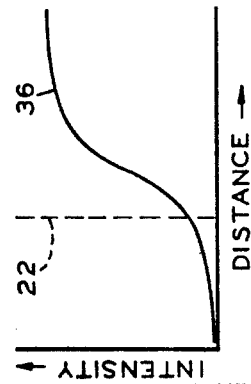
FIGURE 6 is a plot of a light intensity curve from a headlamp versus distance similar to FIGURE 4.

Means for computing this approximate second derivative, C, and indicating its value are shown in FIGURE 5. Three curves are positioned below FIGURE 5, the first of which is shown in FIGURE 6 and is denoted by the numeral 36. This is a plot of the intensity of the light from a properly aimed low-beam headlamp pattern versus distance taken along lines that run through either the horizontal set of light sensitive devices or photoreceptors 25 through 27 or the second set of light sensitive devices or photoreceptors 31 through 33. The second curve 37 shown in FIGURE 8 represents the first derivative of light intensity with respect to these distances, while the third curve 38 shown in FIGURE 9 represents the second derivative of light intensity along these distances. The third curve 38 is approximated by the quantity $$C=I_s-2I+I_B$$

The outputs from the three horizontal light sensitive devices or photoreceptors 25, 26 and 27 are connected to a horizontal computer amplifier 41 which computes the approximate second derivative, C, from the values $I_B$, $I_I$ and $I_s$ that represent the intensities of the light incident on the light sensitive devices or photoreceptors 25, 26 and 27 respectively. The horizontal computer amplifier 41 may be connected to a horizontal aim indicating meter 42 which will indicate the maximum approximate second derivative, C, when achieved.

Thus, if the headlamp aiming operator wishes to manually adjust the headlamp as described subsequently, he may do so by a manually operated screw driver on an adjusting nut or bolt coupled to the headlamp. He may move the horizontal aim indictaing meter into the maximum position thus indicating a maximum value of the approximate second derivative, C, and proper aiming in a horizontal or lateral direction of the high intensity zone 15 of the low-beam headlamp 12 in which the left edge of the high intensity zone is positioned on the line 22.

Means may be provided also to indicate in an additional way the proper aiming of the high intensity zone 15 in a horizontal direction, and means may also be provided for automatically aiming the low-beam light pattern from the headlamp 12. In order to do this, a horizontal peak detector 43 is connected to the horizontal computer amplifier 41 and a horizontal voltage comparator 44 is connected to the horizontal peak detector 43. The horizontal voltage comparator 44 may be connected to an incandescent lamp 45 and may also be connected to a servo unit 46 having a rotatable shaft to which is connected a screw driver or other adjusting tool 47.

The vertical photoreceptors or light sensitive devices 31, 32 and 33 are connected to a vertical computer amplifier 51 that computes the approximate second derivative, C, for the vertical adjustment of the high intensity zone 15 of the low-beam headlamp 12. The vertical computer amplifier 51 may be connected to a vertical aim indicator meter 52 and may also be connected to a vertical peak detector 53. The output of the vertical peak detector 53 may be connected to a vertical voltage comparator 54, and the output of the vertical voltage comparator 54 may be connected to a lamp 55 and/or to a servo unit 56 which has a rotatable shaft to which a suitable adjusting tool, for example, a screw driver 57 may be connected.

FIGURE 13 shows a fender 61 of an automobile vehicle that has mounted therein the low-beam headlamp 12 and the high-beam headlamp 62. Since this invention is concerned with the aiming of the low-beam headlamp 12 only, the description of the invention will be confined to that headlamp. A section of this headlamp is shown in FIGURE 14 taken along the lines 14—14 of FIGURE 13, and this shows the fender 61 having a lamp enclosing mounting structure 64 suitably affixed thereto at 65 and 66. The headlamp 12 has a frame 67 positioned at the rear of the lamp that grips the outer flange of the lamp at 68. A vertical adjusting screw 69 extends through the frame 67 at 70 and engages a nylon nut member 71 mounted in the mounting structure 64. The horizontal adjusting screw 72 shown in FIGURE 13 also has the same construction. This is a standard lamp adjusting structure that need not be described in greater detail. Suffice it to say that when the adjusting screw 69 is rotated, the low-beam headlamp high intensity zone represented by the pattern 15 may be adjusted vertically on the headlamp aiming screen or target board 11, and when the horizontal adjusting screw 72, as shown, is rotated the low-beam intensity pattern 15 may be shifted laterally or horizontally on the headlamp aiming screen or target board 11.

When the automotive vehicle in which the low-beam headlamp 12 has been mounted comes off the assembly line, it is driven into the position shown in FIGURE 1 at the requisite 25′ distance from the headlamp aiming screen or board 11. The headlamp aiming operator then makes a rough adjustment of the adjusting screws 69 and 72 to bring the low-beam high intensity zone represented by the pattern 15 into the general area of the photoreceptors or light sensitive transducers 25 through 27 and 31 through 33.

The headlamp aiming operator may then properly adjust the low-beam high intensity zone by rotating the adjusting screws 69 and 72 so that both the horizontal aim indicating meter 42 and the vertical aim indicating meter 52 register a maximum. In order to do this it is necessary for him to turn the adjusting screws 69 and 72 so that the high intensity zone 15 of the light pattern from the low-beam headlamp scans the three horizontal and the three vertical light sensitive transducers or photoreceptors 25, 26 and 27 and 31, 32 and 33. When both the horizontal and vertical aim indicating meters register a maximum, the high intensity zone 15 of the low-beam headlamp will be properly aimed since the approximate second derivative, C, will be a maximum for both the vertical and horizontal position of the edges of the high intensity zone 15 of the low-beam headlamp 12. This implies that the curve 38 will be positioned as shown in FIGURE 8 in which the maximum of the curve is located at the vertical line 22, the position of the edge of a properly aimed low-beam light pattern. With respect to aiming in a vertical direction, the line 22 may be replaced on the curve 38 with the horizontal line 14.

In the alternative, the vertical and horizontal peak detectors 43 and 53 and the vertical and horizontal voltage comparators 44 and 54 may be used in conjunction with the lamps 45 and 55 to provide proper manual adjustment of the low-beam headlamp. Thus, as the headlamp adjusting operator adjusts or scans the low-beam headlamps 12 in relation to the photoreceptors or light sensitive transducers 25 through 27 and 31 through 33 by turning the adjusting screws 69 and 72, the lamps 45 and 55 will turn on when the maximum value of the approximate second derivative, C, is reached a second time. This is accomplished by the horizontal and vertical voltage comparators which store the maximum value found by the peak detectors 43 and 53 from the output of the computer amplifiers 41 and 51. The horizontal and vertical voltage comparators 44 and 54 store these maximum values and will light the lamps 45 and 55 when the maximum values again appear as the headlamp adjusting operator adjusts the headlamps through the turning of the adjusting screws 69 and 72. In order to adjust these lamps properly, the high intensity zone 15 should be scanned over the light sensitive transducers or photoreceptors 25, 26 and 27 and 31, 32 and 33 by turning the adjusting screws 69 and 72 in one direction and subsequently reversing them.

It can be appreciated also that the servo units 46 and 56 may be employed to properly adjust the high intensity zone 15 of the low-beam headlamp 12. The servo units include means for scanning across the horizontal light sensitive devices or photoreceptors 25 through 27 and the vertical light sensitive devices or photoreceptors 31 through 33 by turning the adjusting screws 69 and 72 from one extreme position to another extreme position. The servo units 46 and 56 then reverse so that the maximum values of the approximate second derivatives, C, as stored in the voltage comparators 44 and 54 as previously discussed, can again be reached. When these maximum values are reached, the voltage comparators 44 and 54 will stop the servo units 46 and 56 thereby stopping the adjusting tools 47 and 57. When this happens, the high intensity zone 15 of the low-beam headlamps 12 will be in a properly adjusted position with the upper edge positioned along the line 14 as shown in FIGURES 1 through 3, and the left-hand edge positioned along the line 22 as shown in these figures.

Referring now to FIGURE 9, there is shown another embodiment of the invention which is in all respects identical to that shown in FIGURE 5 except that other means are employed for deriving the second derivative of light intensity with respect to distance. In this embodiment, means are employed for deriving the exact second derivative rather than the approximate second derivative as denoted by the factor C.

As shown in FIGURE 9, the headlamp aiming board 11 has marked thereon the horizontal line 14 that is a projection of the centerline of the low-beam headlamp 12 and the vertical line 22 positioned 2″ to the right of the vertical projected centerline 13 of lamp 12. The horizontal line 14 and the vertical line 22 indicate where the edges of a properly aimed high intensity zone of a low-beam light pattern should be located.

Single line iconoscopes 81 and 82 are employed to scan the aiming board 11 in the position where the photoreceptor or light sensitive devices 25 through 27 and 31 through 33 were located in the embodiment of the invention shown in FIGURE 5. In other words using a 1964 Ford Galaxie as an example, the single line iconoscope 81 scans on a horizontal line located 7″ below the horizontal line 14 and in the vicinity of the vertical line 22. The single line iconoscope 82, on the other hand, scans along a vertical line located 7″ to the right of the vertical line 22 and in the vicinity of the horizontal line 14.

These single line iconoscopes will produce a signal representative of the intensity of the light sensed along the sensing lines with respect to distance as shown in the first chart or graph 83 shown in FIGURE 10. The outputs from these single line iconoscopes 81 and 82 are fed to a first horizontal differentiator 84 and a first vertical differentiator 85 respectively. The outputs from the first horizontal differentiator 84 and the first vertical differentiator 85 are the first derivatives of the light intensity with respect to distance in the horizontal and vertical directions and are represented by the curve 86 shown in FIGURE 11. The outputs from the first horizontal differentiator 84 and the first vertical differentiator 85 are fed to a second horizontal differentiator 87 and a second vertical differentiator 88 respectively the outputs of which are the second derivatives of the intensity of the light sensed by the single line iconoscopes 81 and 82 with respect to the distance scanned. These second derivatives are represented by the curve shown in FIGURE 12 and denoted by the numeral 91.

Taking the horizontal portion of the system as an example, the dotted line shown on curves 83, 86 and 91 is line 22, and it can be appreciated that the second derivative should be a maximum at the line 22 for a properly aimed high intensity zone of a low-beam headlamp since this is the proper position for the edge of the properly aimed low-beam light pattern. It can be appreciated that this statement is correct when considered in connection with the introductory part of the specification in which it was stated that the inventor had found that the visual system in a human being discerns the maximum rate of change of the slope of a curve that represents intensity with respect to distance as an edge of a high intensity zone of a light pattern. It can be appreciated that this rate of change of the slope of the curve of intensity with respect to distance is the second derivative of a curve representing intensity with respect to distance.

The remainder of the system is precisely the same as that described in FIGURE 5, and the headlamps 12 may be adjusted to provide proper positioning of the low-beam light pattern by precisely the same apparatus and method as that described in the aiming of the headlamps in FIGURE 5. In addition, it will be appreciated that a cathode ray tube could be used to display the second derivative curve 91 shown in FIGURE 12 in relation to the fixed lines 22 and 14. When the curve 91 of the cathode ray tube displayed is as shown in FIGURE 12 in relation to line 22, or line 14 in the vertical aiming situation, the low-beam light pattern is properly aimed. The adjusting of the headlamp will, of course, shift the curve 91 with respect to the line 22 in horizontal adjustment or the line 14 in vertical adjustment.

The invention thus provides an accurate and time saving system and method for aiming properly the low-beam headlamp of an automotive vehicle by making use of the fact that an edge of a light pattern may be discerned or determined by the position of the maximum rate of change of the slope of an intensity wtih respect to distance curve. In the invention, the operator of the headlamp aiming system need take only a fraction of the time to aim the headlamps that he previously took by the visual aiming method. This is true since he merely needs to observe instruments or lights in the case where the servo units are not employed or in the case in which they are employed, the adjustment may be done automatically.

It is to be understood that this invention is not to be limited to the exact construction shown and described, but that various changes and modifications may be made without departing from the spirit and scope of the invention as defined in the appended claims.

I claim:

1. A headlamp aiming system for aiming the low-beam light pattern of an automotive vehicle headlamp assembly of the type having a fixed support, a lamp, and a plurality of adjustable aiming means movably mounting the lamp on the support, said system comprising, a headlamp aiming board for receiving the low-beam light pattern of the headlamp and including a defined location at which an edge of the high intensity zone of the light pattern of a properly aimed low-beam headlamp is to be positioned, the plurality of adjustable aiming means when operated scanning the low-beam light pattern over said defined location, and means positioned with respect to said defined location for producing electrical energy representative of the intensity of the light at said defined location as the edge of the high intensity zone of the low-beam light pattern is scanned over said defined location, and means coupled to said last mentioned means for producing a signal representative of the second derivative of the electrical energy with respect to the scanned distance, and means coupled to said last mentioned means for indicating when said signal representative of the second derivative is a maximum.

2. A headlamp aiming system for aiming the low-beam light pattern of an automotive vehicle headlamp assembly of the type having a fixed support, a lamp, and a plurality of adjustable aiming means movably mounting the lamp on the support, said system comprising, a headlamp aiming board, three light sensitive devices mounted on a line substantially perpendicular to an edge of the high intensity zone of a properly aimed low-beam light pattern, and in a predetermined position with respect to the location of the edge of the high intensity zone of a properly aimed low-beam light pattern, and computing means coupled to said three light sensitive devices for computing the approximate second derivative of the light intensity incident on said three light sensitive devices with respect to distance along said three light sensitive devices as the edge of said high intensity zone of said low-beam light pattern is scanned over said light sensitive devices by the operation of the adjustable aiming means, and means coupled to said computing means for indicating when the approximate second derivative is a maximum.

3. A headlamp aiming system for aiming the low-beam light pattern of an automotive vehicle headlamp assembly of the type having a fixed support, a lamp, and a plurality of adjustable aiming means movably mounting the lamp on the support, said system comprising, a headlamp aiming board, three light sensitive transducers mounted on a line substantially perpendicular to an edge of the high intensity zone of a properly aimed low-beam light pattern and in a predetermined position to the location of the edge of the high intensity zone of a properly aimed low-beam light pattern, the adjustable aiming means when operated scanning a portion of the high intensity zone adjacent the edge over said three light sensitive transducers, and means coupled to said three light sensitive transducers for computing the approximate second derivative of the light intensity incident on said three light sensitive transducers with respect to the distance along said three light sensitive transducers by adding the signals from the light sensitive transducers receiving the greatest and the least light intensity, and substracting twice the signal received by the light sensitive transducers receiving an intermediate light intensity, said light sensitive transducer receiving the intermediate light intensity being positioned between said light sensitive transducers receiving the greatest and the least light intensity.

4. A headlamp aiming system for aiming the low-beam light pattern of an automotive vehicle headlamp assembly of the type having a fixed support, a lamp, and a plurality of adjustable aiming means movably mounting the lamp on the support, said system comprising, a headlamp aiming board for receiving the low-beam light pattern of the headlamp and including a line at which an edge of the high intensity zone of the low-beam light pattern of a properly aimed headlamp is to be positioned, a set of three light sensitive transducers positioned at said headlamp aiming board to receive light from the low-beam light pattern of the headlamp, said three light sensitive transducers being positioned on a line substantially perpendicular to the edge of the high intensity zone with the central of said set of three light sensitive transducers being positioned on said line, the adjustable aiming means when operated scanning a portion of the high intensity zone of the low-beam light pattern adjacent said edge across said three light sensitive transducers, means coupled to said three light sensitive transducers for computing the approximate second derivative of the light intensity incident upon said three light sensitive transducers with respect to distance along said three light sensitive transducers, and means coupled to said last mentioned means for indicating when the approximate second derivative reaches a maximum value.

5. A headlamp aiming system for aiming the low-beam light pattern of an automotive vehicle headlamp assembly of the type having a fixed support, a lamp, and a plurality of adjustable aiming means movably mounting the lamp on the support, said system comprising, a headlamp aiming board for receiving the low-beam light pattern of the headlamp and including a line at which an edge of the high intensity zone of the low-beam light pattern of a properly aimed headlamp is to be positioned, a set of three light sensitive transducers positioned at said headlamp aiming board to receive light from the low-beam light pattern of the headlamp, said three light sensitive transducers being positioned on a line substantially perpendicular to the edge of the high intensity zone with tthe central of said set of three light sensitive transducers being positioned on said first mentioned line, the adjustable aiming means when operated scanning a portion of the high intensity zone of the low-beam light pattern adjacent said edge across said three light sensitive transducers, means coupled to said three light sensitive transducers for computing the approximate second derivative of the light intensity with respect to distance of light incident upon said three light sensitive transducers by adding the signals from the light sensitive transducers located on either side of said central light sensitive transducer and subtracting twice the signal received by said central light sensitive transducer, and means coupled to said last mentioned means for indicating when the approximate second derivative reaches a maximum value.

6. An apparatus for aiming the low-beam light pattern of an automotive vehicle headlamp comprising, a vehicle body, a headlamp supported in said vehicle body, a headlamp aiming board for receiving the light pattern of the headlamp and including a line at which an edge of the high intensity zone of the light pattern of a properly aimed low-beam headlamp is to be positioned, adjustment means coupling said headlamp and said vehicle body for movably adjusting the headlamp with respect to said vehicle body for scanning the low-beam light pattern in the vicinity of the edge of the high intensity zone of the low-beam light pattern over said line, and means located in a predetermined position with respect to said line for producing a signal representative of the second derivative of the light intensity in the vicinity of said line with respect to the distance scanned, and the means engaging said adjustment means and coupled to said last mentioned means for automatically adjusting the headlamp to bring said signal representative of the second derivative to a maximum value.

7. An apparatus for aiming the low-beam light pattern of an automotive vehicle headlamp comprising, a vehicle body, a headlamp supported in said vehicle body, a headlamp aiming board for receiving the light pattern of the low-beam headlamp and including a line at which an edge of the high intensity zone of the low-beam light pattern of a properly aimed headlamp is to be positioned, adjustment means coupling said headlamp and said vehicle body for movably adjusting the headlamp with respect to said vehicle body for scanning the low-beam light pattern in the vicinity of the edge of the high intensity zone of the low-beam light pattern over said line, three light sensitive transducers positioned along a line substantially perpendicular to and intersecting said first mentioned line with the central of said three light sensitive transducers being positioned on said first mentioned line, computing means coupled to said three light sensitive transducers for computing the approximate second derivative of the light intensity incident thereon with respect to distance along said line on which said three light sensitive transducers are located, and means engaging said adjustment means and coupled to said last mentioned means for automatically adjusting the headlamp to bring said approximate second derivative to a maximum value.

8. An apparatus for aiming the low-beam light pattern of an automotive headlamp comprising, a vehicle body, a headlamp supported in said vehicle body, a headlamp aiming board for receiving the low-beam light pattern of the headlamp and including a line at which an edge of the high intensity zone of the low-beam light pattern of a properly aimed headlamp is to be positioned, adjustment means coupling said vehicle body and said headlamp movably adjusting the headlamp relative to the vehicle body for scanning the edge of the high intensity zone of the low-beam light pattern over said line, means located in a predetermined position with respect to said line for sensing the light intensity in the vicinity of said line, means coupled to said last mentioned means for computing the second derivative of the light intensity at said line with respect to the scanned distance, a peak detector coupled to said last mentioned means, a voltage comparator coupled to said peak detector, a servo unit coupled to said voltage comparator and including an adjusting tool engaging said adjustment means, said servo unit including means for scanning said light pattern from one extreme position to another extreme position over said line during which scan the second derivative will reach maximum value, said voltage comparator including means for storing said maximum value received from said peak detector, said servo unit including means for reversing the scan of the high intensity zone of the low-beam light pattern, and including means coupled to said voltage comparator for bringing said adjusting tool to a rest position when the maximum value of said second derivative has again been reached during the reverse scan.

9. An apparatus for aiming the low-beam light pattern of an automotive headlamp comprising, a vehicle body, a headlamp supported in said vehicle body, a headlamp aiming board for receiving the low-beam light pattern of the low-beam headlamp and including a line at which an edge of the high intensity zone of the light pattern of a properly aimed low-beam headlamp is to be positioned, adjustment means coupling said vehicle body and said headlamp movably adjusting the headlamp relative to the vehicle body for scanning the edge of the high intensity zone of the low-beam light pattern over said line, three light sensitive transducers positioned on a line substantially perpendicular to and intersecting said first mentioned line with the central light sensitive transducer being positioned on said first mentioned line, means coupled to said three light sensitive transducers for computing the approximate second derivative of the light intensities incident upon said three light sensitive transducers with respect to the distance along the line upon which said three light sensitive transducers are located, a peak detector coupled to said last mentioned means, a voltage comparator coupled to said peak detector, a servo unit coupled to said voltage comparator and including an adjusting tool engaging said adjustment means, said servo unit including means for scanning said light pattern from one extreme position to another extreme position over said first mentioned line during which scan the approximate second derivative will reach a maximum value, said voltage comparator including means for storing said maximum value received from said peak detector, said servo unit including means for reversing the scan of the high intensity zone of the low-beam light pattern, and including means coupled to said voltage comparator for bringing said adjusting tool to a rest position when the maximum value of said approximate second derivative has again been reached during the reverse scan.

10. A method of aiming the low-beam light pattern of an automotive vehicle comprising, focusing the low-beam pattern on an aiming board, producing electric signals having amplitudes that are a function of the light intensity falling on said aiming board from means located in a predetermined position with respect to an edge of a properly aimed high intensity zone of the low-beam light pattern, scanning the high intensity zone in the vicinity of the edge of the light pattern over the predetermined position in a direction substantially perpendicular to said edge, computing the approximate second derivative of the amplitudes of the electric signals with respect to the distance scanned and terminating the scanning operation when the approximate second derivative reaches a maximum value.

11. A method of aiming the low-beam light pattern of an automotive vehicle comprising, focusing the low-beam pattern on an aiming board, producing electric signals having amplitudes that are a function of the light intensity falling on the aiming board by means located in a predetermined position with respect to the horizontal edge of a properly aimed high intensity zone of the low-beam light pattern, scanning the high intensity zone in the vicinity of the horizontal edge of the light pattern vertically over the predetermined position, computing the approximate second derivative of the amplitudes of the electric signals with respect to the vertical distance scanned and terminating the scanning operation when the approximate second derivative reaches a maximum value, producing electric signals having amplitudes that are a function of the light intensity falling on said aiming board by means located in a predetermined position with respect to the vertical edge of a properly aimed high intensity zone of the low-beam light pattern, scanning the high intensity zone in the vicinity of the vertical edge of the light pattern horizontally over the predetermined location, computing the approximate second derivative of the amplitudes of the electric signals with respect to the horizontal distance scanned, and terminating the scanning operation when the approximate second derivative reaches a maximum value.

12. A method of aiming the low-beam light pattern of an automotive vehicle comprising, focusing the low-beam pattern on an aiming board, producing electrical energy having an amplitude that is a function of the light intensity falling on said aiming board from means located in a predetermined position with respect to an edge of a properly aimed light intensity zone of the low-beam light pattern, scanning the high intensity zone in the vicinity of the edge of the light pattern over the predetermined position in a direction substantially perpendicular to said edge, producing a signal which is representative of the second derivative of the amplitude of the electrical energy with respect to the distance scanned and terminating the scanning operation when the signal reaches a maximum value.

13. A method of aiming the low-beam light pattern of an automobile vehicle comprising, focusing the low-beam pattern on an aiming board, producing electrical vertical distance scanned and terminating th escanning intensity falling on the aiming board by means located in a predetermined position with respect to the horizontal edge of a properly aimed high intensity zone of the low-beam light pattern, scanning the high intensity zone in the vicinity of the horizontal edge of the light pattern vertically over the predetermined position, producing a signal which is representative of the second derivative of the amplitude of the electrical energy with respect to the vertical distance scanned and terminating the scanning operation when the signal reaches a maximum value, producing electrical energy having an amplitude that is a function of the light intensity falling on said aiming board by means located in a predetermined position with respect to the vertical edge of a properly aimed high intensity zone of the low-beam light pattern scanning the high intensity zone in the vicinity of the vertical edge of the light pattern horizontally over the predetermined location, producing a signal which is representative of the second derivative of the amplitude of the electric signal with respect to the horizontal distance scanned, and terminating the scanning operation when the signal reaches a maximum value.

References Cited

UNITED STATES PATENTS

| | | |
|---|---|---|
| 3,383,977 | 5/1968 | Carlson. |
| 2,977,843 | 4/1961 | Graeber et al. |
| 3,077,139 | 2/1963 | Todd et al. |

RONALD L. WIBERT, Primary Examiner

T. R. MOHR, Assistant Examiner

U.S. Cl. X.R.

250—201; 356—122